(12) United States Patent
Koduru et al.

(10) Patent No.: US 7,788,644 B2
(45) Date of Patent: Aug. 31, 2010

(54) METHOD AND SYSTEM FOR MONITORING PERFORMANCE ON A MOBILE DEVICE

(75) Inventors: Rajendra Kumar Reddy Koduru, Jersey city, NJ (US); Janusz Smilek, St. Wendel (DE); Hendrik C. R. Lock, Dettenheim (DE); Ivan Schreter, Leimen (DE); Christian Latzel, Brühl (DE); Toblas Stolzenberger, Heidelberg (DE)

(73) Assignee: SAP AG, Walldorf (DE)

( * ) Notice: Subject to any disclaimer, the term of this patent is extended or adjusted under 35 U.S.C. 154(b) by 300 days.

(21) Appl. No.: 11/090,682

(22) Filed: Mar. 24, 2005

(65) Prior Publication Data
US 2006/0218533 A1 Sep. 28, 2006

(51) Int. Cl.
G06F 9/44 (2006.01)
G06F 11/00 (2006.01)

(52) U.S. Cl. .................. 717/127; 717/124; 717/131; 714/38

(58) Field of Classification Search ............ 717/130, 717/124–135; 714/39, 47, 35, 38, 37
See application file for complete search history.

(56) References Cited

U.S. PATENT DOCUMENTS

| | | | | |
|---|---|---|---|---|
| 6,002,872 | A * | 12/1999 | Alexander et al. | 717/127 |
| 6,126,330 | A * | 10/2000 | Knight | 717/127 |
| 6,189,142 | B1 * | 2/2001 | Johnston et al. | 717/125 |
| 6,263,491 | B1 * | 7/2001 | Hunt | 717/130 |
| 6,314,558 | B1 * | 11/2001 | Angel et al. | 717/118 |
| 6,467,052 | B1 * | 10/2002 | Kaler et al. | 714/39 |
| 6,643,842 | B2 * | 11/2003 | Angel et al. | 717/130 |
| 6,671,830 | B2 * | 12/2003 | Kaler et al. | 714/39 |
| 6,691,254 | B2 * | 2/2004 | Kaler et al. | 714/39 |
| 6,792,460 | B2 * | 9/2004 | Oulu et al. | 709/224 |
| 6,799,147 | B1 * | 9/2004 | Balasubramanian et al. | 702/186 |

(Continued)

OTHER PUBLICATIONS

Cavitt et al., "A performance monitoring application for distributed interactive simulations (DIS)," Dec. 1997, IEEE, p. 421-428.*

(Continued)

*Primary Examiner*—Wei Y Zhen
*Assistant Examiner*—Qing Chen
(74) *Attorney, Agent, or Firm*—Kenyon & Kenyon LLP

(57) ABSTRACT

A method and system are provided for implementing performance monitoring of an application on a mobile device. An instrumentation tool is provided allowing a user to view the entities in an application file for a mobile device and selecting those entities for which performance monitoring is to be implemented. The instrumentation tool adds performance monitoring methods to the application file and generates a new instrumented application file that is transferred to the mobile device. When the instrumented application file is executed on the mobile device, the performance monitoring methods instrumented into the file execute generating data in a performance log file that is stored on the mobile device. This performance log file may be transferred to a remote device for further analysis in addition to viewing the performance log file on the mobile device. The user selected entities for performance monitoring in the application file may be saved to a configuration file that can later be loaded and modified by the user to facilitate further performance monitoring of an application.

17 Claims, 17 Drawing Sheets

U.S. PATENT DOCUMENTS

| | | | |
|---|---|---|---|
| 7,103,876 B1 * | 9/2006 | Lopez et al. | 717/127 |
| 7,117,411 B2 * | 10/2006 | McNeely et al. | 714/724 |
| 7,178,131 B2 * | 2/2007 | Mitchell et al. | 717/124 |
| 7,240,335 B2 * | 7/2007 | Angel et al. | 717/130 |
| 7,269,824 B2 * | 9/2007 | Noy et al. | 717/127 |
| 7,281,242 B2 * | 10/2007 | Inamdar | 717/158 |
| 7,318,219 B2 * | 1/2008 | Hall | 717/127 |
| 7,401,141 B2 * | 7/2008 | Carusi et al. | 709/224 |
| 7,496,896 B2 * | 2/2009 | Bley et al. | 717/127 |
| 2003/0145309 A1 * | 7/2003 | Inamdar | 717/118 |
| 2004/0158819 A1 * | 8/2004 | Cuomo et al. | 717/128 |
| 2004/0163077 A1 * | 8/2004 | Dimpsey et al. | 717/130 |
| 2005/0015750 A1 * | 1/2005 | Bley et al. | 717/127 |
| 2005/0039171 A1 * | 2/2005 | Avakian et al. | 717/127 |
| 2005/0039187 A1 * | 2/2005 | Avakian et al. | 719/310 |
| 2005/0155019 A1 * | 7/2005 | Levine et al. | 717/127 |

OTHER PUBLICATIONS

Harkema et al., "Performance Monitoring of Java Applications," Jul. 2002, ACM, p. 114-127.*

Lee et al., "Monitoring Data Archives for Grid Environments," Nov. 2002, IEEE, p. 1-10.*

* cited by examiner

501 — ☐ 🗁 C:Documents and Settings\D043504\My Documents\PMF_Tests.jar
502 — ⌬ ☐ 🗁 com/sap/ip/me/pmf/tests:multipleexit
510 — ⌬ ☐ 🗁 ExitOnException.class
520 — ☑ 🗋 public void <init>C
521 — ☑ 🗋 public void <init>(String str1)
522 — ☑ 🗋 public void <init>(float f)throws java.io IOException
523 — ☑ 🗋 public void <init>(long f)throws java.io IOException
524 — ☑ 🗋 public void trycatch()
525 — ☑ 🗋 public void trycatchfinally()
526 — ☐ 🗋 public void throwException()throws java.lang.Exception
511 — ⌬ ☐ 🗁 TryCatchFinally.class
530 — ☐ 🗋 public void <init>C
531 — ☑ 🗋 public void <init>(String str1)
532 — ☐ 🗋 public void <init>(int k)
533 — ☐ 🗋 public void trycatch()
534 — ☐ 🗋 public void trycatchfinally()
535 — ☐ 🗋 public void tryFinally()
503 — ⌬ ☐ 🗁 com/sap/ip/me/pmf/tests:singleexit
512 — ⌬ ☐ 🗋 AbstractClass.class
513 — ⌬ ☐ 🗋 Constructors.class
514 — ⌬ ☐ 🗋 InvalidMethods.class
515 — ⌬ ☐ 🗋 NormalExit.class
516 — ⌬ ☐ 🗋 superConstructors.class
504 — ⌬ ☐ 🗁 com/sap/ip/me/pmf/tests:util

```
Class HelloWorld{
    public static void main (String args[] ) {
    System.out.println( "Hello World" );
    }
}
```

FIG.8

METHOD AND SYSTEM FOR MONITORING PERFORMANCE ON A MOBILE DEVICE

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a method and system for monitoring performance in an application where a user can select what entities in an application file are monitored and the monitoring commands are incorporated into a new version of the application file according to one embodiment of the present invention.

BACKGROUND

Many performance measurement tools exist in the commercial market each having its own specific capabilities. The most common of these systems perform full code instrumentation (i.e., brute force instrumentation) where performance monitoring is instrumented for all methods of an application. This can be particularly advantageous because it may capture all the calls made by the application during runtime. For example, calls are dynamic and are not part of the static hierarchy of an application program. During application runtime a call may or may not be made. Using the following pseudo-code as an example illustrates why a method call in an application may or may not occur during runtime.

```
if x ... {
    method_left
} else {
    method_right
}
```

In the above pseudo-code, either method_left or method_right is executed depending on the value of variable x. Full code instrumentation provides performance monitoring of all the calls including those to both method_left and method_right and may include monitoring of variable values such as variable x. For this and other reasons, full code instrumentation for performance monitoring is common in conventional systems such as IBM's Rational PurifyPlus (formerly Visual Quantify) and Compuware Corp.'s DevPartner Studio (formerly NuMega).

Applications for mobile devices (mobile applications) present a particular challenge to performance monitoring in that the greater the instrumentation of the application code to be monitored the greater the overhead placed on the application and the limited resources of the mobile device. The limited processor capability and memory/storage for mobile devices such as, for example, personal digital assistants (PDAs) and mobile phones, means that greater instrumentation may result in greater execution times for the application as well as increased memory/storage usage on the mobile device. This may be sufficient to cause the application to fail to execute on the mobile device or the mobile device to crash rather than just a degradation in performance. In addition, the limited memory/storage of most mobile devices prevents extensive logging of the performance monitoring data. The greater the amount of application code instrumented, the greater the amount of memory or storage needed by a performance log file on the mobile device to store the performance monitoring data. Because mobile devices are not always connected to a network, reliance on a server or other remote device to store the logging data may not be adequate to capture the necessary performance monitoring data. In addition, the greater the degree of instrumentation of the application code, the greater the extent to which the performance measurements are skewed by the resource requirements of the performance monitoring. For example, the performance monitoring instrumentation code may be measuring its own resource consumption and impact on the application program.

The present invention presents an innovative method for addressing the challenges of performance monitoring in resource limited environments such as for an application running on a mobile device.

BRIEF DESCRIPTION OF THE DRAWINGS

FIG. 5 is a diagram illustrating a tree structure of the entities in a valid application file parsed and opened for instrumentation according to one embodiment of the present invention.

FIG. 8 is a diagram illustrating the source code for a simple program using the class in FIG. 7 according to one embodiment of the present invention.

DETAILED DESCRIPTION

Figure 1:
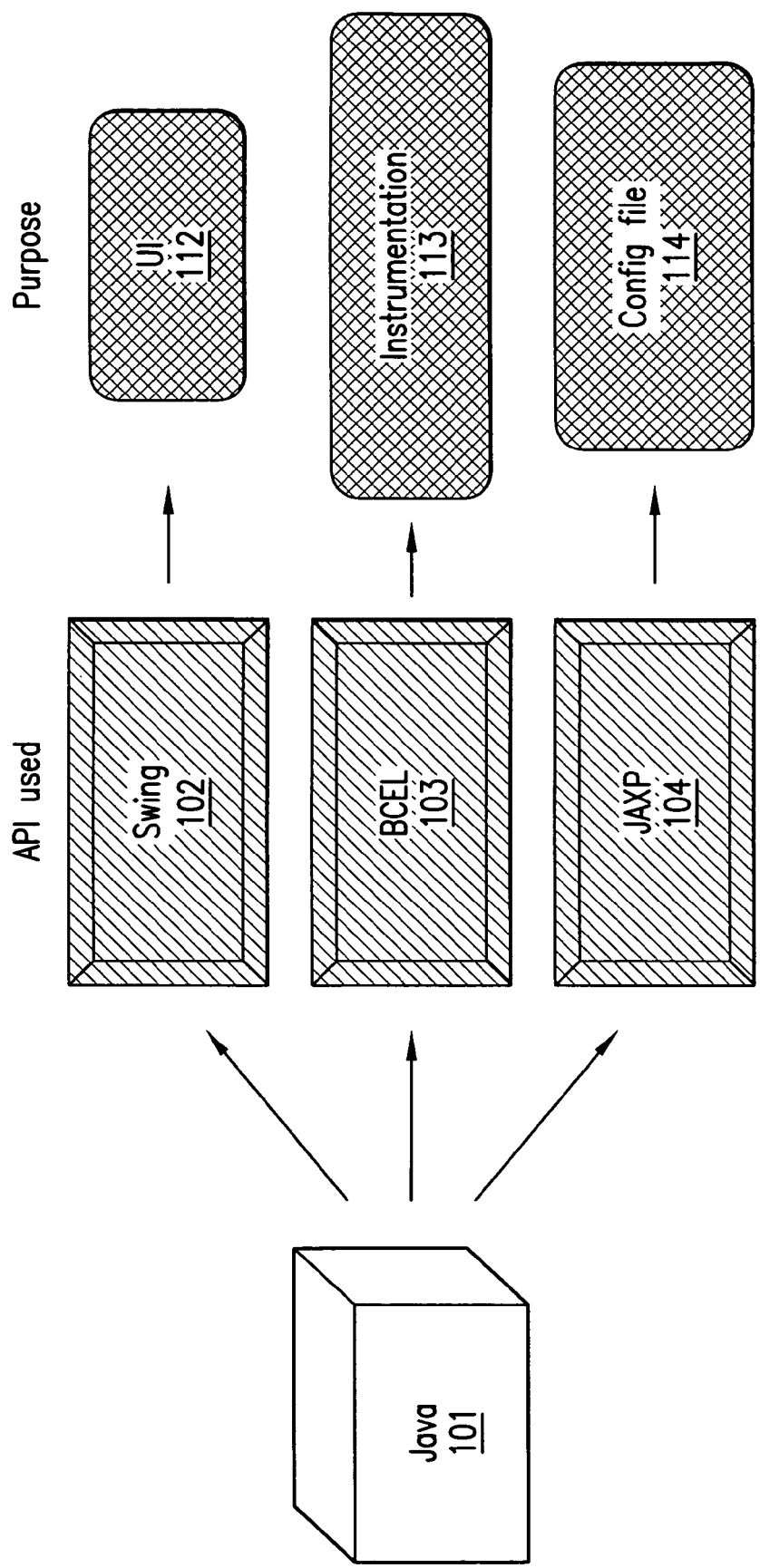
FIG. 1 is a diagram illustrating the programming environment of the instrumentation tool according to one embodiment of the present invention.

A method and system are provided for implementing performance monitoring of an application on a mobile device. According to one embodiment of the present invention an instrumentation tool is provided allowing a user to view the entities in an application file for a mobile device and selecting those entities for which performance monitoring is to be implemented. The instrumentation tool adds performance monitoring methods to the application file and generates a new instrumented application file that is transferred to the mobile device. When the instrumented application file is executed on the mobile device, the performance monitoring methods instrumented into the file execute generating data in a performance log file that is stored on the mobile device. This performance log file may be transferred to a remote device for further analysis in addition to viewing the performance log file on the mobile device according to one embodiment of the present invention. The user selected entities for performance monitoring in the application file may be saved to a configuration file that can later be loaded and modified by the user to facilitate further performance monitoring of an application.

Performance monitoring refers to any profiling operation that measures the runtime behavior of an application on a mobile device. For example, memory consumption is a runtime behavior of an application that may be profiled or monitored. Any measurable runtime behavior to include, for example, method or function calls made by the entity may be profiled or monitored according to the present invention. Performance monitoring is implemented on an entity basis as discussed below providing particular details on how selected entities in the application are performing. The terms performance monitoring and profiling are used interchangeable throughout this specification. Though the example embodiment discussed above relates to a mobile device, the present invention may be applied to any processor based device in other embodiments of the present invention.

According to one embodiment of the present invention, the instrumentation—the addition of performance monitoring methods or functions in an application file—is not a brute force monitoring of the application as conventionally known where the performance of the entire application is monitored. Instead, the performance monitoring is tailored to user selected entities in the application allowing for focused monitoring and/or reduced resource requirements facilitating the implementation of performance monitoring on mobile devices. Entities may be any element of an application and may include an entire application file such as an archive file, a package, a module, a method, a class, a function, a block of code, and/or a line of code. The instrumentation tool determines the entities available and presents those entities to the user according to one embodiment of the present invention. The instrumentation tool may be constructed in a way to use particular entities suited to the platform or programming environment for which it is written. For example, an instrumentation tool for Java™ applications may allow the instrumentation of performance monitoring for entities such as, for example, Java™ ARchive (JAR) files, classes, and methods.

The instrumentation of an application file may be performed for a source code file, an intermediate file (e.g., a Java™ bytecode file), or a binary file. For example, if a source code file is being used, a source code parser may be used by the instrumentation tool to determine the entities to be presented to the user to select for performance monitoring. Some programming languages such as Java™ have an intermediate step between source code and executable code. In Java™, source code is compiled into intermediate bytecode that contains abstract machine-independent instructions that are later interpreted by a Java™ virtual machine application (in the Java™ platform) into machine-specific executable code. Even binary code contains symbolic information that can be used to determine parts of the code such as entities. For example, a compiler debugger may use this type of symbolic information. In the example embodiment of the present invention illustrated below, instrumentation occurs at the intermediate Java™ bytecode level though in other embodiments instrumentation may occur at the source code or binary code levels.

The result of the instrumentation of an application file is the collecting of performance monitoring data on the mobile device. During the performance monitoring or profiling on the mobile device, this data is collected and stored in a file. This file is generally stored on the mobile device because the mobile device will at times not be connected to any other device. However, the file may be transferred to a remote device during periods of mobile device connectivity according to this embodiment. For example, when a mobile device is connected to another device over a wireless connection such as an IEEE 802.11g wireless network, Bluetooth or other wireless connection, the file may be transferred to the remote device (e.g., a personal computer or workstation) releasing the storage space used on the mobile device. It is undesirable to transfer the data to any device, therefore, in one embodiment the mobile device or the instrumented file transferred to the mobile device may need to be affiliated or otherwise registered with the remote device to which the performance monitoring data will be transferred. This affiliation may occur automatically during the instrumentation process by incorporating affiliation information during the instrumentation of the performance monitoring methods or may occur during the transfer of the instrumented file to the mobile device. Alternatively, the affiliation may require user specification in a manual or semi-automated process in other various embodiments of the present invention. The transfer of the performance monitoring data to a remote device may also allow for greater processing analysis of the data than may otherwise be possible on the mobile device.

FIG. 1 is a diagram illustrating the programming environment of the instrumentation tool according to one embodiment of the present invention. According to this embodiment, the instrumentation tool is developed using the Java™ programming language 101 with the Java™ Swing Application Programming Interface (API) 102—graphical user interface components that run on any native Java™ application—Apache Software Foundation's Byte Code Engineering Library (BCEL) 103—that allows for retrieval and editing of Java™ bytecode—and Java™ API for XML Processing (JAXP) 104—allowing data exchange, parsing, and transformation of XML files through Java™. According to this embodiment the Swing Set 102 facilitates the user interface 112 of the instrumentation tool. The Byte Code Engineering Library (BCEL) 103 is used in the instrumentation 113 of the performance monitoring and JAXP 104 is used to generate, read, and load configuration (config) files 114 that store the user selected entities facilitating additional and/or iterative performance measurement of the application.

Figure 2:
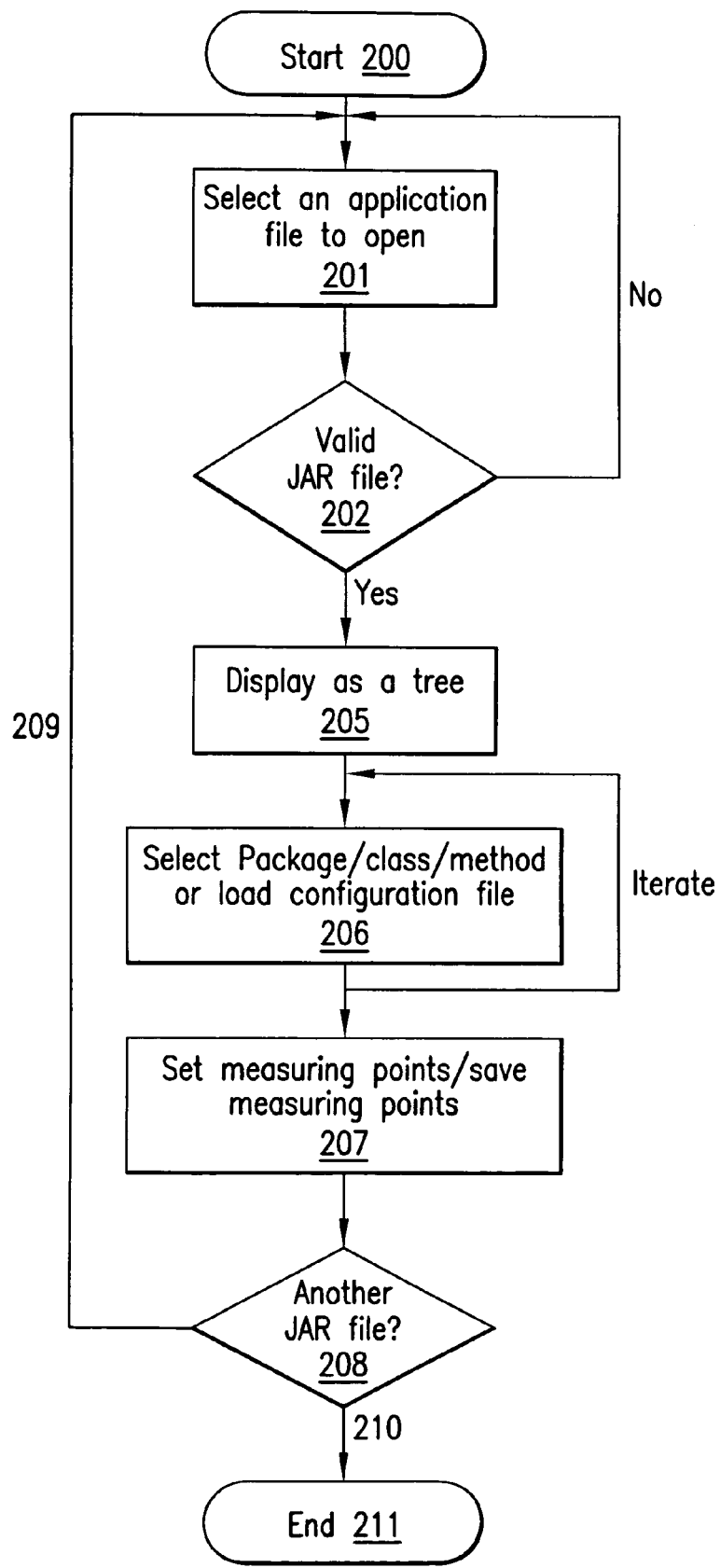
FIG. 2 is a flowchart illustrating the operation of the instrumentation tool according to one embodiment of the present invention.

FIG. 2 is a flowchart illustrating the operation of the instrumentation tool according to one embodiment of the present invention. The process begins 200 with the initiation of the instrumentation tool through some initiating mechanism such as, for example, the user clicking on an instrumentation tool icon. The user may next select an application file to be opened 201. The application file contains the entities from which the user will select those entities that he/she wants to implement performance monitoring for. In this example embodiment, an application file may be a Java™ JAR file. The next step 202 is determining whether the selected file is a valid application file for the instrumentation tool. If the file is not valid 203, the user may select another file 201. If the file is valid 204, the entities of the file are determined and displayed as a hierarchical tree structure 205. In a further step 206, the user may then select from the entities in the tree structure in an iterative process until all the desired entities for which performance monitoring is to be instrumented are selected. The measuring points (the performance monitoring methods) are set 207 for each of the selected entities and a configuration file identifying the selecting entities and measuring points may be saved for future use. In the next step 208, the user may determine whether performance monitoring will be implemented for another application file. If the user wants to instrument performance monitoring 209 for other application files, the process is repeated from the file selection step 201. If the user does not want instrument performance monitoring 210 for other application files, the program terminates 211. The result of the instrumentation tool is new instrumented version of the application file containing the performance monitoring methods and calls. This instrumented application may then be transferred to the mobile device for use in place of the original application file.

Figure 3:
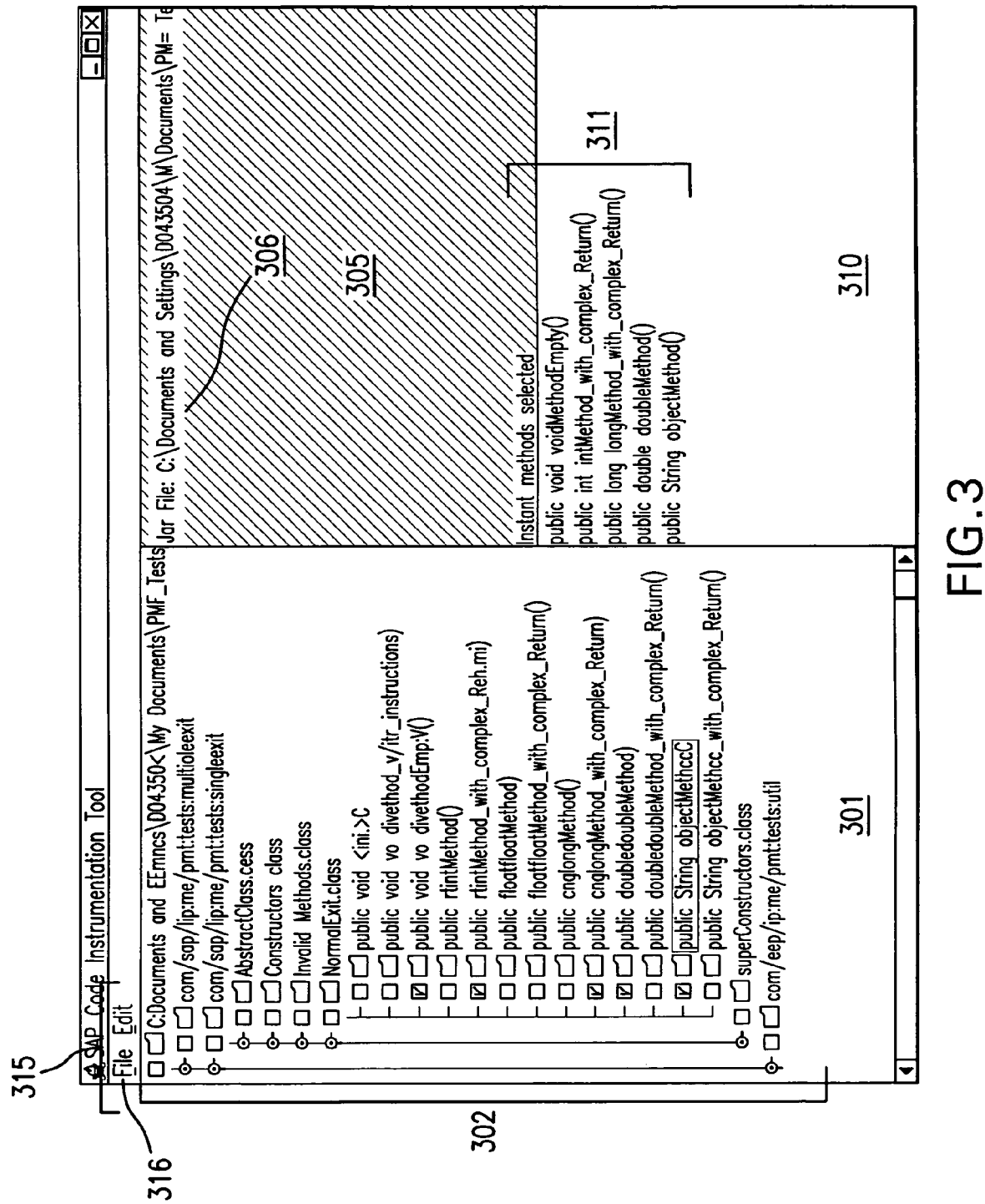
FIG. 3 is a screen shot of the instrumentation tool according to one embodiment of the present invention.

As previously stated the user interacts with the instrumentation tool through a graphical user interface 112. In a Java™ environment, standard graphical user interface components are found in Java Foundation Classes and in particular the Swing set 102 of components in one such class library. Java™ Swing includes features providing user interface components such as frames, trees, and tables in addition to buttons, list boxes, combo boxes, and checkboxes. A window or frame is created and used as the main interface for accessing the instrumentation tool according to this embodiment. The user starts the instrumentation tool in a conventional manner such as, for example, clicking on an associated startup.bat file. FIG. 3 is a screen shot of the instrumentation tool according to one embodiment of the present invention. The screen shot shown in FIG. 3 is similar to the initially displayed frame except that the left-side panel 301 displaying the hierarchical tree structure of the application file 302 (e.g., JAR file), the top right-side panel 305 displaying the path 306 of the application file (e.g., JAR file), and the bottom right-side panel 310 displaying a list (a list box) of the names of the methods 311 selected by the user for instrumentation to implement performance monitoring are all initially empty. The left-side panel 301 does not contain any packages, classes, methods, or entities because the user has not yet chosen an application file for instrumentation. For this same reason, the upper right-side panel 305 is also empty. The lower right-side panel 310 is similarly empty because methods are not available to be selected. Some of the drop-down menu 315 items may also be disabled because they can not be implemented at the moment. For example, if no file is open then a Save menu item may be disabled in the File menu 316. Disabled menu items may be displayed in a shadowed or faded format in one embodiment though any method to differentiate disabled menu items including temporarily removing them from the menus may be used in various embodiments of the present invention. Alternatively, the menu items may not be disabled and an error or other message may be provided if these menu items are executed at an inappropriate time. Once the user initiates the instrumentation tool, the user may open a file to be profiled (instrumented) using any of the available means to do so. For example, a file may be opened by selecting the Open option in the File drop-down menu 316 or by selecting an appropriate shortcut key combination such as CTRL+O where available.

Figure 4:
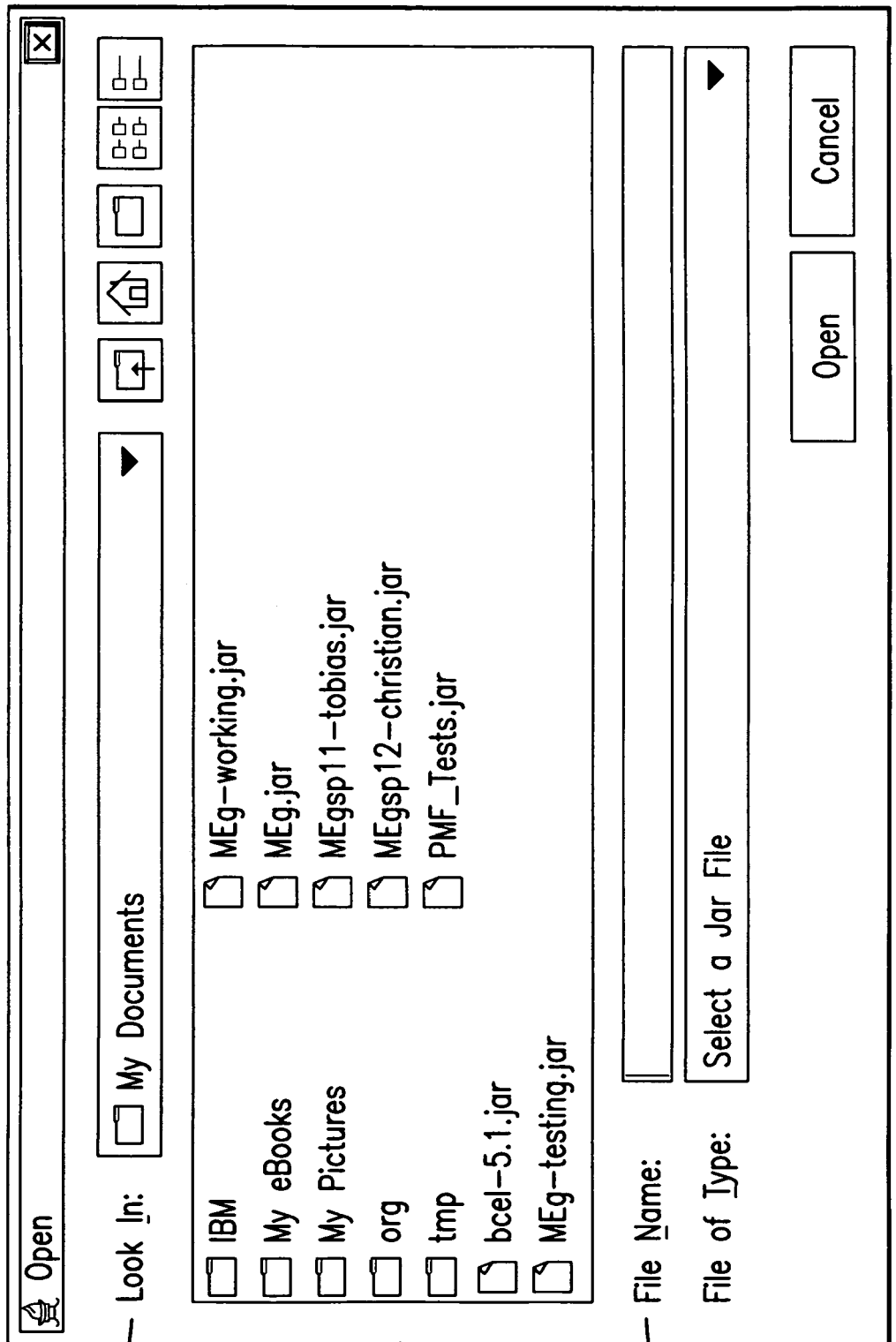
FIG. 4 is an open file dialog box for the instrumentation tool allowing a user to select a file for profiling according to one embodiment of the present invention.

FIG. 4 is an open file dialog box for the instrumentation tool allowing a user to select a file for profiling according to one embodiment of the present invention. The JFileChooser dialog box 400 shown in FIG. 4 allows a user to conventionally navigate to and select a JAR or other application file for the instrumentation tool to profile. The user may conventionally browse through folders and directories 401 and select an available file 402 or he/she may directly enter the file name and/or path 403. As is conventionally known, a value for the most recently used path may be stored and used in future operations. Once the user selects and opens a file such as, for example, a JAR file, a validity check determining whether the file is appropriate for instrumentation is made. If the file is not valid, an error message may be displayed and the file is not opened according to this embodiment. If the file is valid, it is parsed and converted into a tree structure such as, for example, a Java Tree (JTree) class structure.

FIG. 5 is a diagram illustrating a tree structure of the entities in a valid application file parsed and opened for instrumentation according to one embodiment of the present invention. The opened application file 501 is displayed along with its component packages 502-504. The subordinate classes 510-516 for each of the packages are also displayed along with the methods 520-526, 530-535 for each of the classes. Each node of the tree may be expanded or contracted as desired by the user in the embodiment shown in FIG. 5. The instrumentation tool class (CheckRenderer discussed below) that renders the tree structure in the graphical user interface customizes the display to add a check box next to each node entry. The result is that each node (e.g., file, package, class, method) has an associated check box that can be checked if the user desires to provide instrumentation (profiling or performance measurements) for that node. For example, if a checkbox for a method is selected (i.e., is checked) it indicates that the user wants to provide instrumentation for that method. Selecting or deselecting a higher node such as a class, package, or file as shown in FIG. 5 results in all subordinate nodes either being selected (i.e., checking their associated checkboxes) or deselected (i.e., unchecking their associated checkboxes) as appropriate to the operation being implemented at the higher node. The hierarchical selection and deselection in the tree structure can substantially facilitate the instrumentation of entities especially where the application file is larger and/or more complex.

Figure 6:
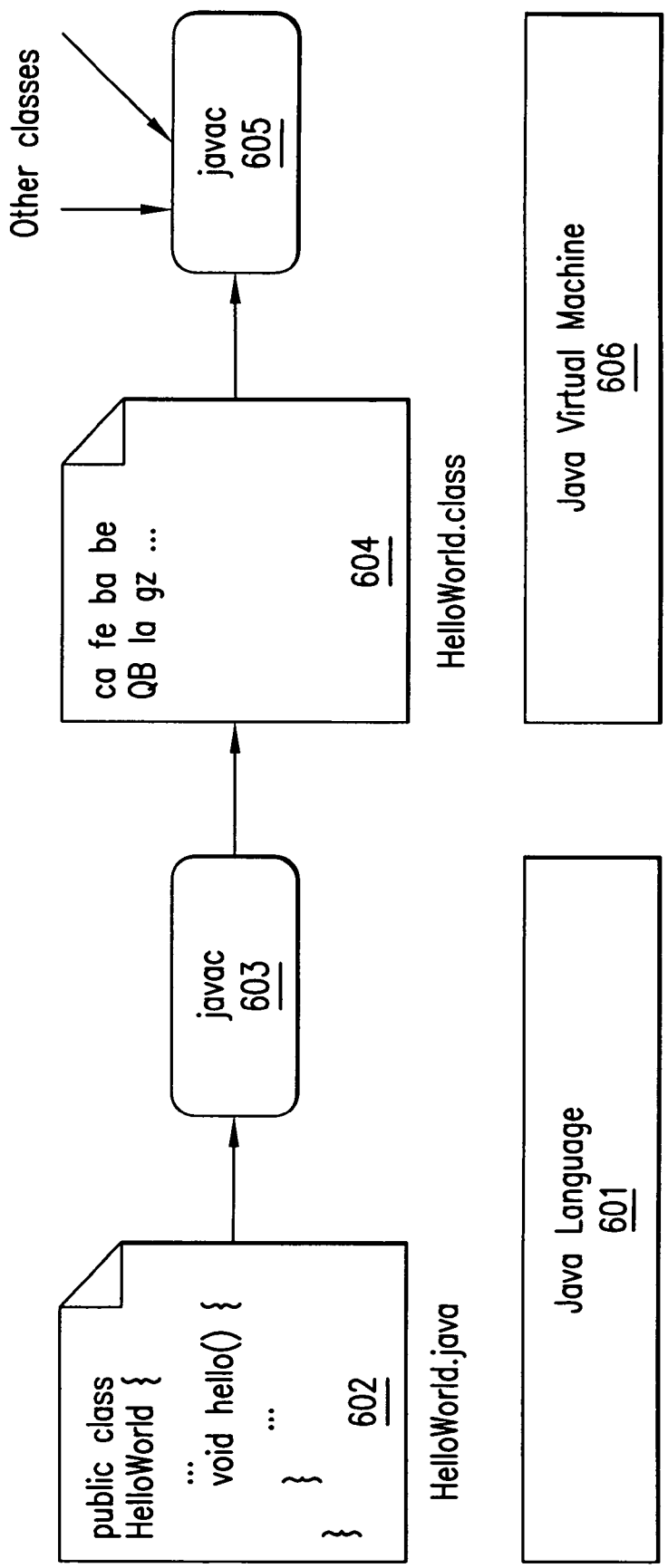
FIG. 6 is a diagram illustrating the Java™ source code to executable code model as interpreted for one embodiment of the present invention.

The instrumentation process 113 is illustrated using Java™ in the following example according to one embodiment of the present invention. Java™ programs are those written in the Java™ programming language using class files that are compiled into bytecode for the Java™ virtual machine (JVM) of the Java™ platform. Bytecode is machine independent code generated by the Java™ compiler and executed by the Java™ interpreter. The Java™ interpreter decodes and executes bytecode for the Java™ virtual machine—an execution engine that executes the bytecode commands in the Java™ class files on a microprocessor. FIG. 6 is a diagram illustrating the Java™ source code to executable code model as interpreted for one embodiment of the present invention. The program illustrated 602 is a simple program that displays the message "Hello World". The Java™ programming language 601 source code class file 602 is compiled 603 by the Java™ compiler into a class file containing Java™ bytecode 604 that is interpreted 605 for execution using other class files as necessary by the Java™ interpreter of the Java™ virtual machine 606. The instrumentation process adds instructions to the existing programs by engineering the bytecode using, for example, Apache Software Foundation's Byte Code Engineering Library (BCEL) according to this embodiment of the present invention. BCEL provides a framework to manipulate Java™ class files with the framework used to insert the performance monitoring methods necessary for the instrumentation of the application file. This embodiment is only one example of how the instrumentation of the programming code can be implemented and other methods may be used in other embodiments of the present invention.

Figure 7:
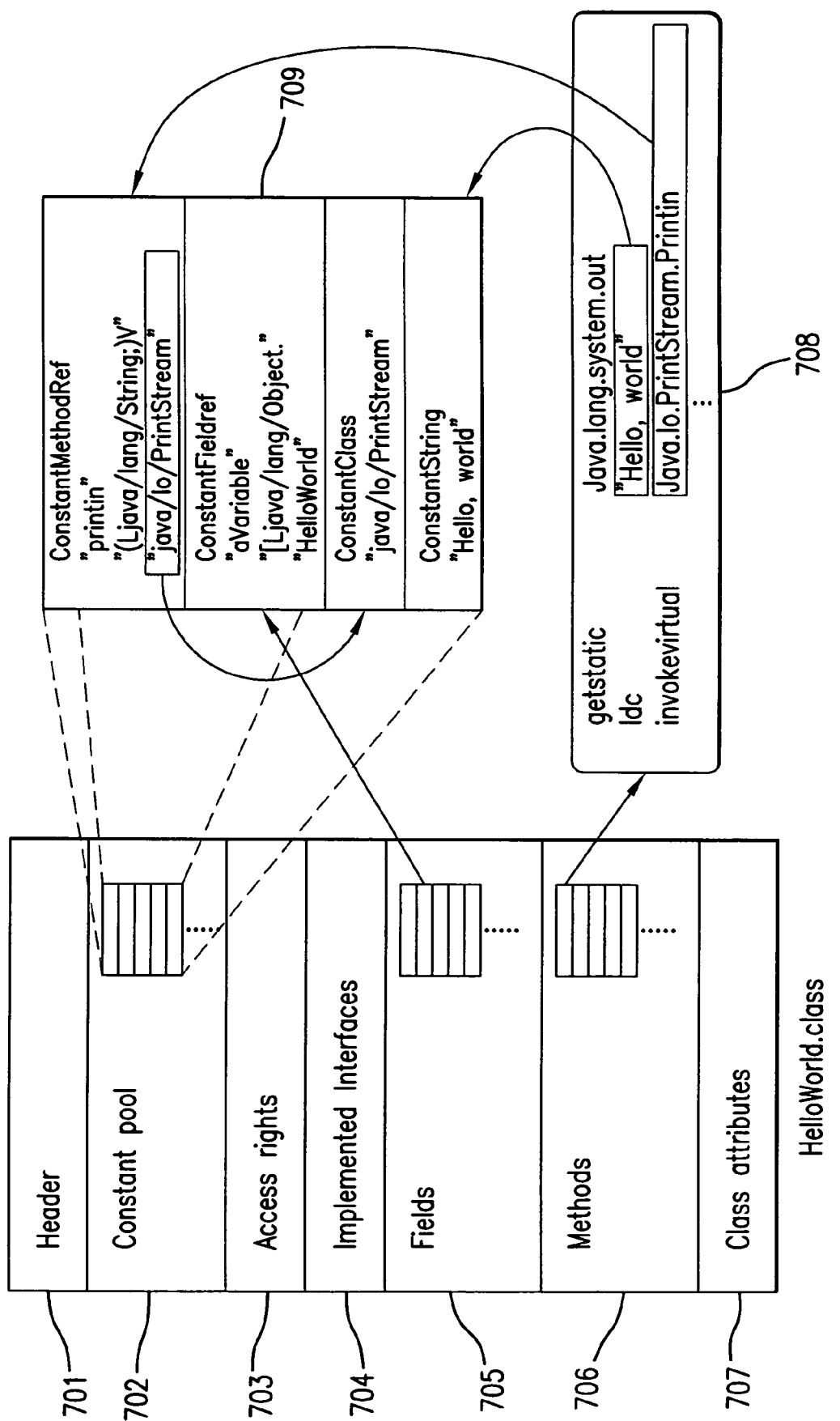
FIG. 7 is a diagram providing an abstract illustration of the Java™ class file for a simple program according to one embodiment of the present invention.

FIG. 7 is a diagram providing an abstract illustration of the Java™ class file for a simple program according to one embodiment of the present invention. The illustration in FIG. 7 is for a standard Java™ class file 700 presented in a manner that facilitates the describing of an example instrumentation process according to one embodiment of the present invention. The Java™ class file 700 may be viewed as containing a number of sections beginning with a header 701 containing an identification number and/or version number. A constant pool 702 may contain a listing of string constants representing class, fields, and methods in the Java™ class. Access rights 703, implemented interfaces 704 (e.g., optional interfaces implemented in the current class using the implements Java™ programming language keyword), fields 705 (data members of the class), and attributes 707 may also be incorporated. The methods 706 are the functions that are defined for the class. The methods 706 include 708 defined constants 709. FIG. 8 is a diagram illustrating the source code for a simple program using the class in FIG. 7 according to one embodiment of the present invention.

Figure 9:
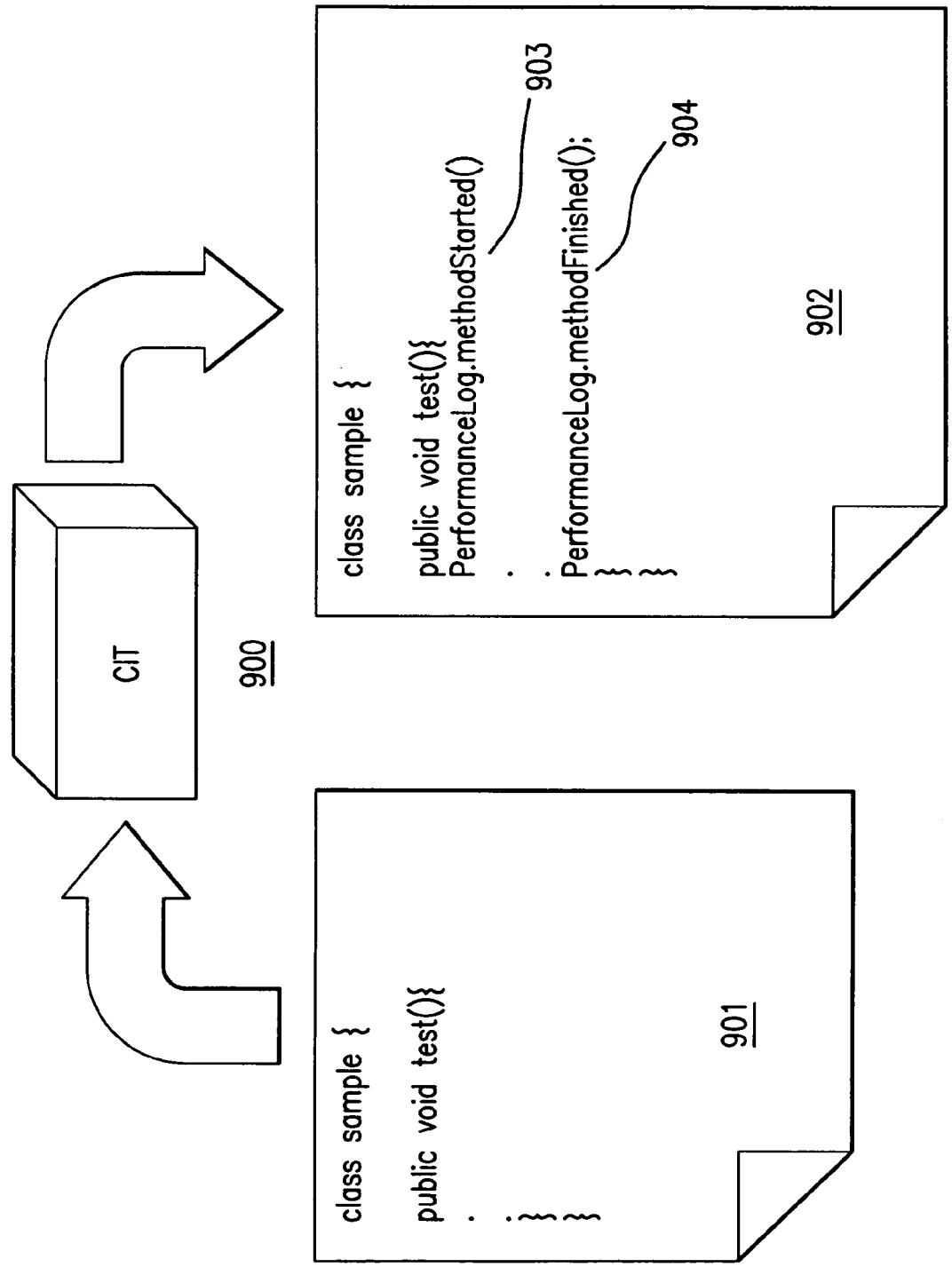
FIG. 9 is a diagram illustrating the instrumentation of Java™ source code for a class using the instrumentation tool according to one embodiment of the present invention.

At least one performance monitoring (profiling) method needs to be added to the application file to implement the instrumentation of the performance measurements according to this embodiment of the present invention. This embodiment uses the BCEL provided Java™ API to create a method object for the at least one performance monitoring method. In particular MethodGen of BCEL may be used in this process. A new Java™ class is created and defined according to the current class but also modified with the at least one profiling (performance monitoring) method. The result is a Java™ class incorporating the instrumentation methods that allow for performance monitoring. FIG. 9 is a diagram illustrating the instrumentation of Java™ source code for a class using the instrumentation tool according to one embodiment of the present invention. The original Java™ class source code 901 is shown before being acted on by the instrumentation tool 900. The resulting source code 902 contains the additional profiling method calls 903, 904 that provide for the performance monitoring according to this embodiment of the present invention.

Figure 10:
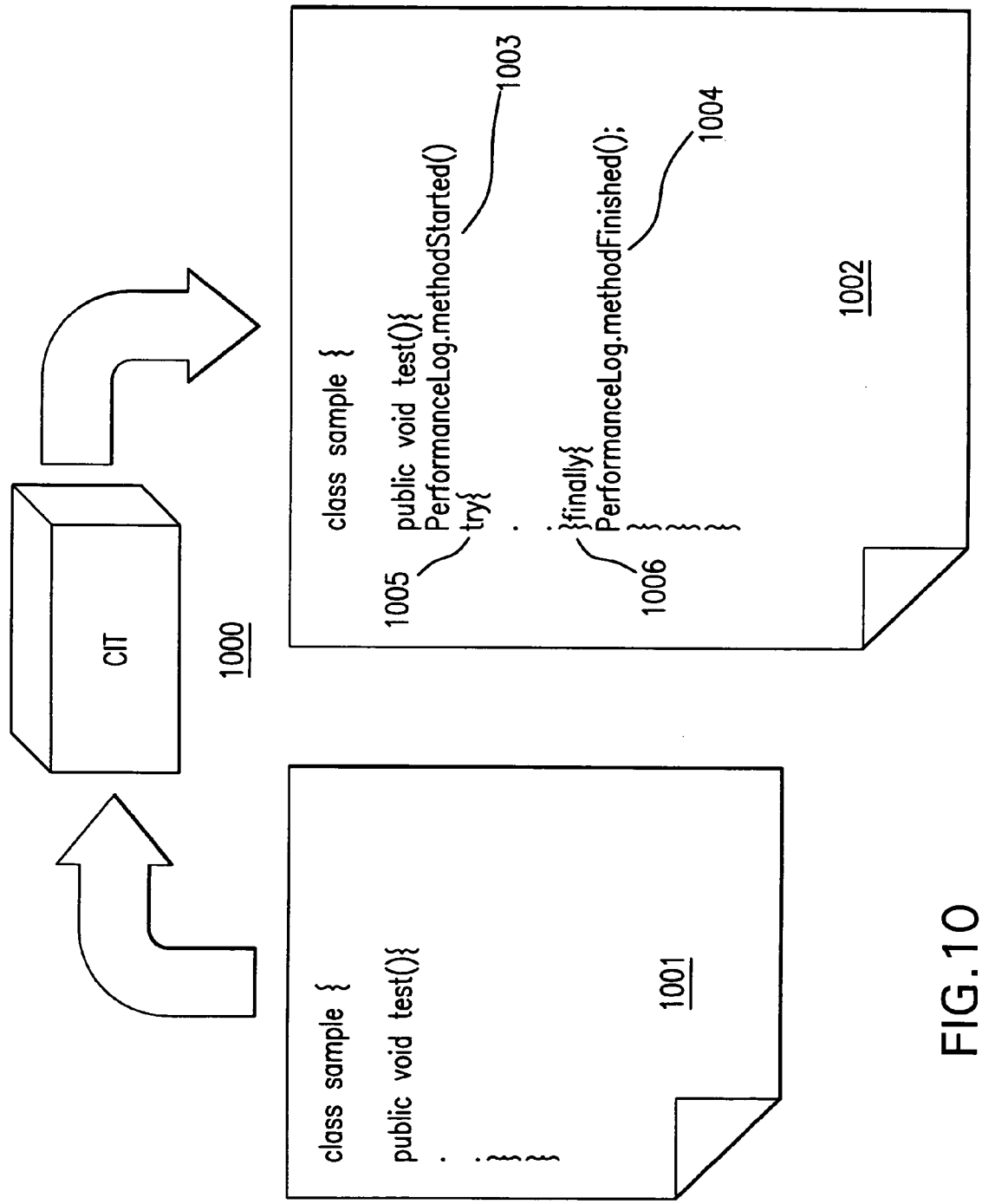
FIG. 10 is a diagram illustrating the instrumentation of Java™ source code for a class using the instrumentation tool where profiling occurs even in the case of an exception being thrown according to one embodiment of the present invention.

FIG. 10 is a diagram illustrating the instrumentation of Java™ source code for a class using the instrumentation tool where profiling occurs even in the case of an exception being thrown according to one embodiment of the present invention. The original Java™ class source code 1001 is shown before being acted on by the instrumentation tool 1000. The resulting source 1002 not only contains additional profiling method calls 1003, 1004 but includes code that allows the profiling to occur even if an exception is thrown within a block of statements. The try keyword 1005 defines a block of statements that may throw a Java™ programming language exception. A catch block (not shown) may be used to handle the specific exceptions thrown in the try block 1005. The finally block 1006 contains statements that execute whether or not an exception is thrown in the try block 1005, the exception indicating that a runtime error occurred. The use of a profiling method call 1004 in the finally block 1006 ensures that profiling occurs even if an exception is thrown. The instrumentation of the profiling method calls may also take into account other situations in the application code such as, for example, constructors that create a new object or a super ( . . . ) access to the class from which the current class is derived (the class inherited by the current class).

Figure 11:
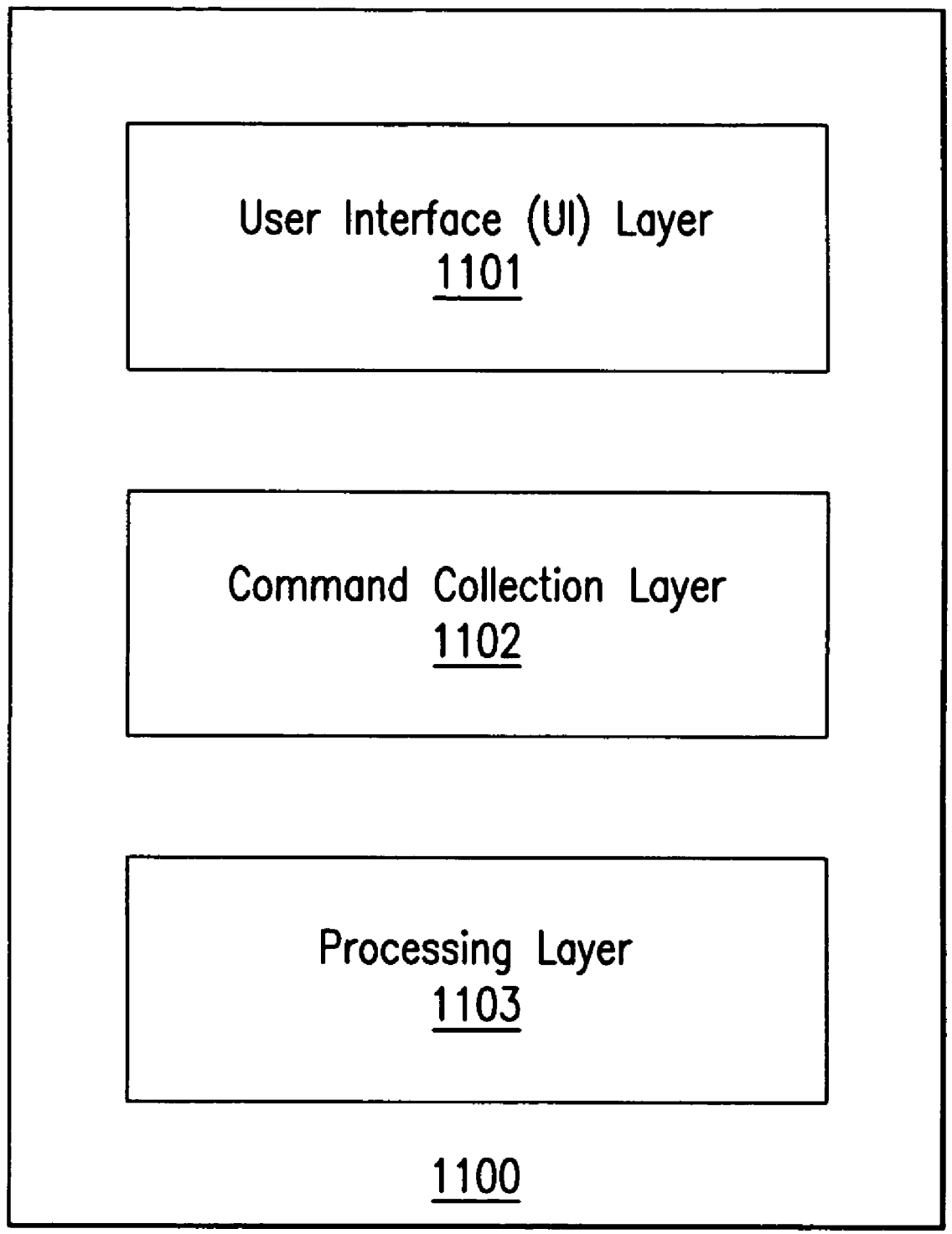
FIG. 11 is a diagram illustrating the basic structure of the instrumentation tool according to one embodiment of the present invention.

FIG. 11 is a diagram illustrating the basic structure of the instrumentation tool according to one embodiment of the present invention. The instrumentation tool 1100 may be represented as having three layers incorporating different functional objects (classes) at each layer. The layers are conceptual to help represent the functions in the instrumentation tool and don't necessarily indicate any other distinction between the layer elements. The user interface layer 1101 is the highest level layer and handles the presentation of information to the user and the interaction with the user. The command collection layer 1102 is an intermediate layer that collects the entity selections from the user and stores them in an internal data structure. The processing layer 1103 is the lowest level layer and contains the classes responsible for the actual processing of the instrumentation tool 1100. Each of the layers in turn may contain classes of objects in an object oriented environment that handle the processing performed at that layer according to this embodiment of the present invention. In this example embodiment, Java is the object oriented language used for the development of the instrumentation tool.

Figure 12:
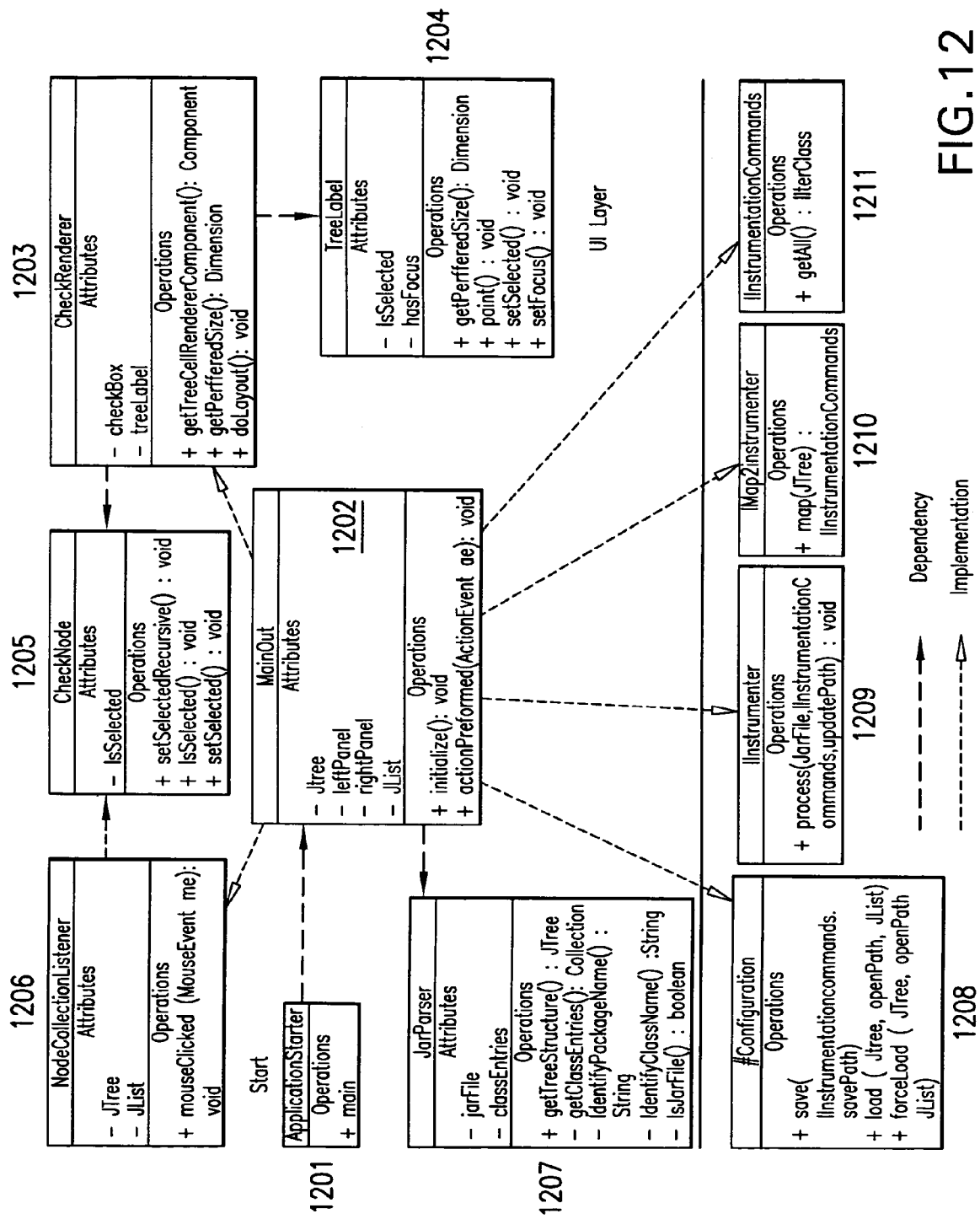
FIG. 12 is a diagram illustrating an example of the classes making up the User Interface Layer of the instrumentation tool according to one embodiment of the present invention.

FIG. 12 is a diagram illustrating an example of the classes making up the User Interface Layer of the instrumentation tool according to one embodiment of the present invention. The user interface layer 1101 contains the processes that present information to the user and handle the interaction with the user. The user interface layer 1101 may contain a number of classes such as, for example: an ApplicationStarter class 1201, a MainGui class 1202, a CheckNode class 1203, a NodeSelectionListener class 1204, and a JarParser class 1205. The ApplicationStarter class 1201 is the class that initiates the instrumentation tool and is the entry point to the user interface layer for the user. The ApplicationStarter class 1201, in addition to handling any instrumentation tool initiation, initiates a call to the MainGui class 1202. The ApplicationStarter class 1201 is called when the instrumentation first executes. As conventionally understood, a call to a class results in the instantiation of an object containing the class attributes. The term class is used interchangeably herein to refer to both the class and the instantiated objects of the class.

The MainGui class 1202 is responsible for displaying the user interface to include displaying the tree structure of the entities from one or more application files selected by the user. For example, the MainGui class 1202 may display the tree structure of a Java™ Archive (JAR) file selected by the user. According to the embodiment shown in FIG. 12, a CheckRenderer class 1203 is called by the MainGui class 1202 to assist in the display of the tree structure with the CheckRender class 1203 in turn triggering the TreeLabel class 1204. The CheckRenderer 1203 and TreeLabel 1204 classes help display the entities in a tree structure with a check box at each node to allow selection of the associated entity at that node of the tree. The CheckNode class 1205 is the class for each displayed node of the tree. If a node in the tree is selected/deselected by a user, the CheckNode class 1205 selects/deselects all the subordinate nodes for that node as well. For example, if a class is selected all the methods of that class will also be selected. A selected class may be shown by a check in the check box according to this embodiment of the present invention. Selecting an already selected node (a node with a check in the check box) deselects that node (clears the check from the check box) as well as all subordinate nodes. This facilitates the selection process by allowing group selection/deselection instead of requiring individual selection/deselection of each entity.

Figure 13A:
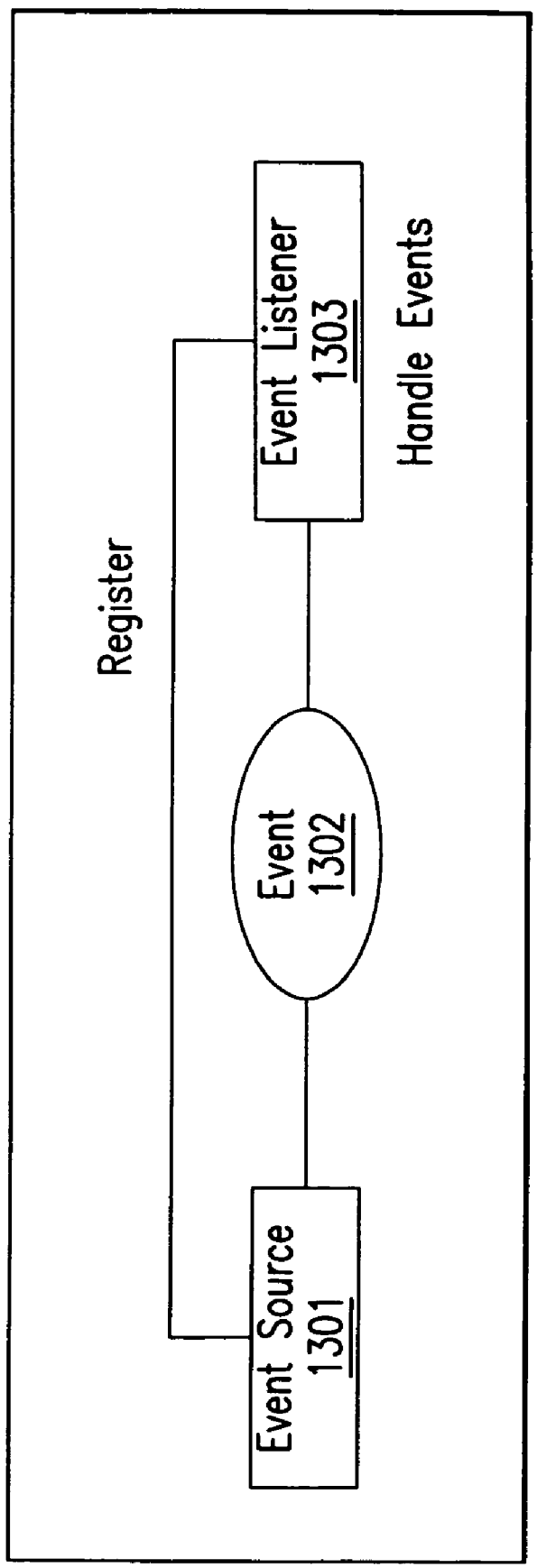
FIG. 13a is a diagram illustrating a simplified abstract model of event handling in Java™.
Figure 13B:
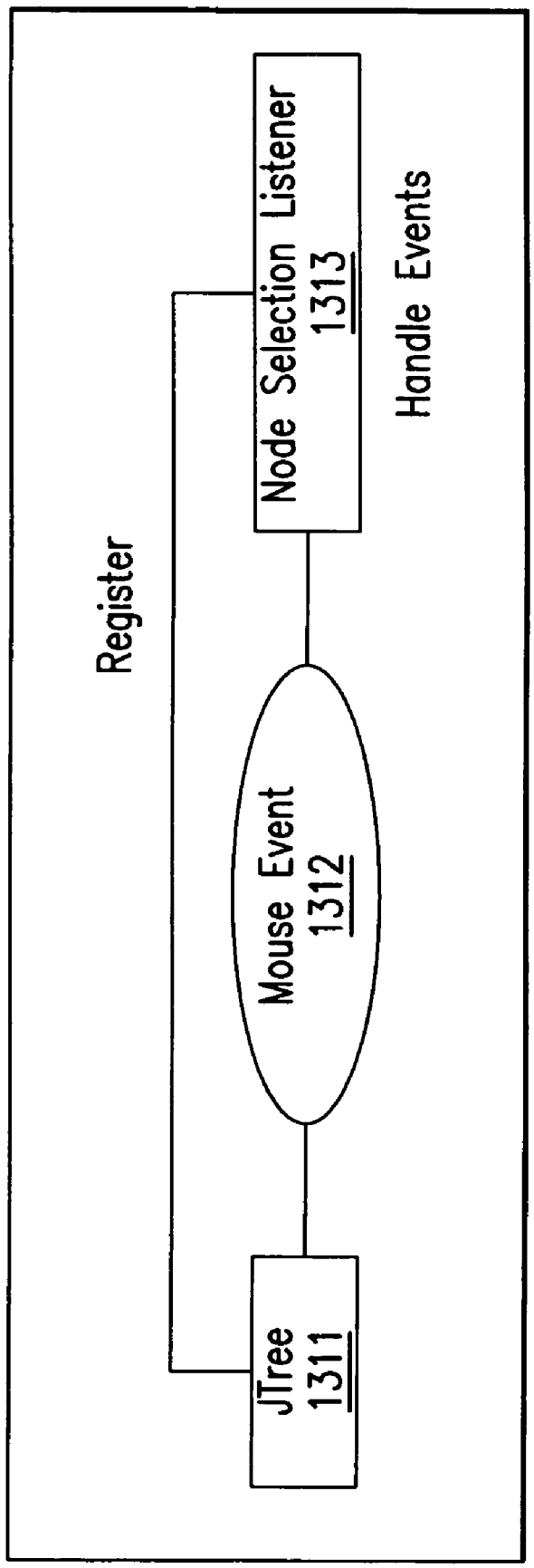
FIG. 13b is a diagram illustrating an example of event processing in the instrumentation tool according to one embodiment of the present invention.

The NodeSelectionListener 1206 handles node selection events and may populate a list box 310 in the user interface with these selections. Events include the interaction between the user and the graphical user interface and are handled using graphical user interface (GUI) components. For example in Java™, components from the Abstract Window Toolkit (AWT)—a collection of GUI components using native platform versions of the components—or the Swing Set—a code name for a collection of GUI components that run uniformly on any native platform that supports the Java™ virtual machine—may be used to communicate these interactions with a Java™ program. FIG. 13a is a diagram illustrating a simplified abstract model of event handling in Java™. The event source 1301 is the object generating the event in question. For example for a click event on a button in the user interface, the event source is the button clicked on. The event object 1302 contains the information related to the event. For example clicking on a button causes an object to be created containing the information associated with the event such as event type, etc. The event listener 1303 is an object registered with the event source 1301 and having a method for event handling. The event object 1302 is passed to the event listener 1303 according to the abstract model shown in FIG. 13a. FIG. 13b is a diagram illustrating an example of event processing in the instrumentation tool according to one embodiment of the present invention. According to this example, the JTree object 1311—the tree structure of the application file in the instrumentation tool—is the event source 1301. The NodeSelectionListener 1313 is the class for the event listener 1302 registered with the JTree object 1311. When the user clicks on a node in the tree structure (the JTree object 1311), a click or select event is initiated with the event information contained in an event object 1312. The event object 1312 is passed to the NodeSelectionListener 1313 which generally calls at least one method to handle the event.

The JarParser class 1207 in FIG. 12 verifies that a file selected by the user is a valid Java™ archive (JAR) file and if so creates a hierarchical tree structure of its contents. The user interface layer 1101 communicates with command collection layer 1102 and the processing layer 1103 using the interfaces 1208-1211 which are described later in this specification.

Figure 14:
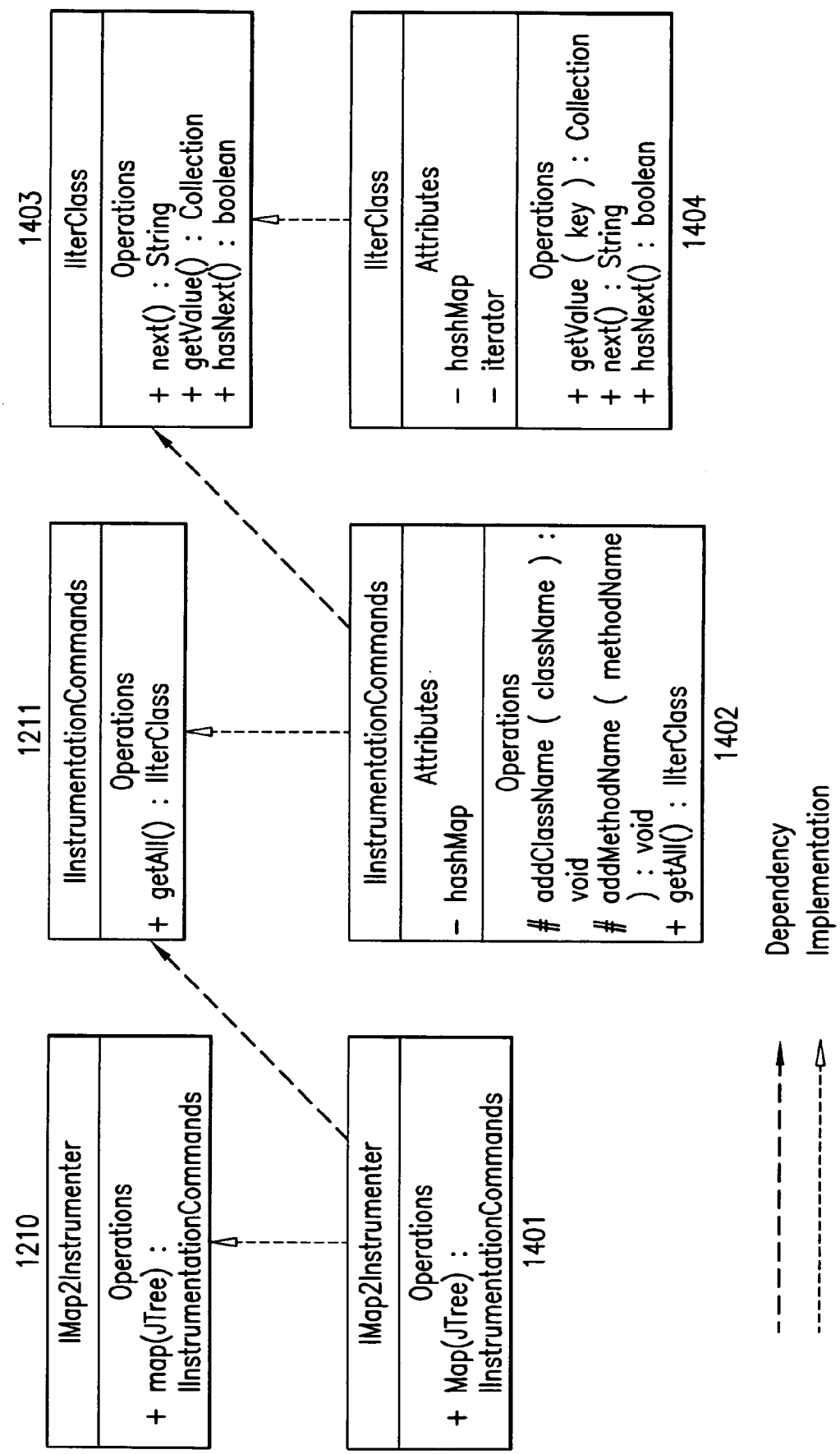
FIG. 14 is a diagram illustrating an example of the classes making up the Command Collection Layer of the instrumentation tool according to one embodiment of the present invention.

FIG. 14 is a diagram illustrating an example of the classes making up the Command Collection Layer of the instrumentation tool according to one embodiment of the present invention. The command collection layer 1102 handles the collection and storage of the user selected entities from the tree structure. The command collection layer 1102 may include a number of classes some acting as interfaces such as, for example, an IMap2Instrumenter class 1210, a Map2Instrumenter class 1401, an IInstrumentationCommands class 1211, an InstrumentationCommands class 1402, an IIterClass class 1403, and an IterClass class 1404. The IMap2Instrumenter class 1210 serves as an interface between the user interface layer 1101 and the command collection layer 1102 allowing the user interface layer 1101 to be free from the command format at the command collection layer 1102. The IMap2Instrumenter class 1210 receives the checked tree structure (JTree) and maps the selected entities to an internal data structure. The Map2Instrumenter class 1401 contains the mapping logic for mapping the JTree tree structure to the IInstrumentationCommands class 1211. The IInstrumentationCommands class 1211 serves as an interface between the user interface layer 1101, the command collection layer 1102, and the processing layer 1103 establishing and returning an iterator—which is used to generate a new Java™ class based on the existing class and the additional instrumentation commands. The InstrumentationCommands class 1402 helps implement the IInstrumentationCommands interface 1211 by, for example, providing method(s) for adding selected entities to a HashMap attribute. IIterClass 1403 and IterClass 1404 classes are used to store the selected entities using the HashMap and to return the iterator.

Figure 15:
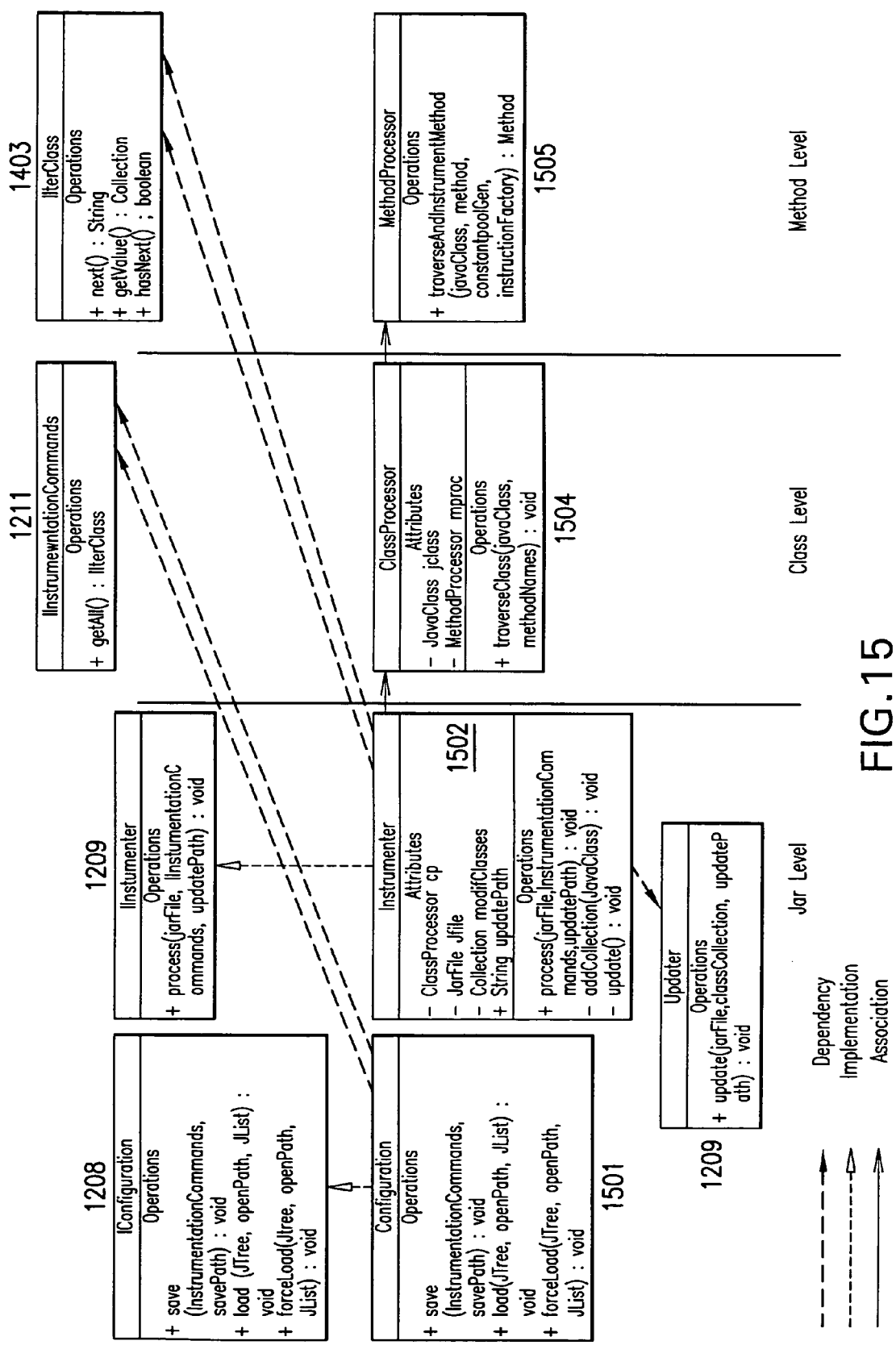
FIG. 15 is a diagram illustrating an example of the classes making up the Processing Layer of the instrumentation tool according to one embodiment of the present invention.

FIG. 15 is a diagram illustrating an example of the classes making up the Processing Layer of the instrumentation tool according to one embodiment of the present invention. The processing layer 1103 generates the new Java™ class with the bytecode instrumentation according to the selections made by the user. The processing layer 1103 may include a number of classes some acting as interfaces such as, for example, an IConfiguration class 1208, a Configuration class 1501, an IInstrumenter class 1209, an Instrumenter class 1502, an IInstrumentationCommands class 1211, an IIterClass class 1403, a ClassProcessor class 1504, a MethodProcessor class 1505, and an Updater class 1503. The IConfiguration class 1208 serves as the interface between the process layer 1103 and the user interface layer 1101 allowing the user to save and load configuration files—files containing the measuring points selected by the user. For example, the File drop-down menu 316 in the user interface of the instrumentation tool may provide menu items such as Save Config, Force Load Config, and Load and Merge Config. These options may allow the user to save the measuring points (the selected entities) to a configuration file which can later be modified or loaded back into the instrumentation tool. This configuration file may be stored, in one embodiment, as an extensible Markup Language (XML) document. The instrumentation tool may use the Java™ API for XML Processing (JAXP) to parse and transform these XML configuration files. By saving the configuration file, a user does not have to specify again the measuring points (the selected entities) and can work from the already saved file. This may be particularly important where large numbers of measuring points (selected entities) are involved and/or where a user will need to frequently adjust the measuring points for performance monitoring. The user may save the already defined measuring points by selecting the Save Config option and storing the file as is conventionally known. This file may then be loaded back into the instrumentation tool using, for example, the Force Load Config or the Load and Merge Config menu items. The Force Load Config menu item clears all the selections the user has made in the instrumentation tool then loads the selected entities (measuring points) from the configuration file into the instrumentation tool. The Load and Merge Config menu item loads the selected entities (measuring points) from the configuration file into the instrumentation tool merging those measuring points with others selected be the user in the instrumentation tool. The Configuration class 1501 provides the methods to implement the menu items for the configuration files as discussed above. The IInstrumenter class 1209 serves as an interface between the processing layer 1103 and the user interface layer 1101 for processing the user selected JAR file.

The Instrumenter class 1502 runs the iterator and creates a new Java™ class for the instrumentation using data from the IInstrumentationCommands 1211 and IIterClass 1403 classes. The Instrumenter class 1502 handles processing at the JAR file level while delegating the class level processing to the ClassProcessor class 1504. The ClassProcessor class 1504 processes the classes for which instrumentation is to occur retrieving the class and the methods selected by the user. The ClassProcessor class 1504 creates Method object and delegates the actual instrumentation of the methods to the MethodProcessor class 1505. The MethodProcessor class 1505 handles the instrumentation at the method level and this is where the instrumentation occurs according to this embodiment. Using separate classes to process the instrumentation at each hierarchy (e.g., JAR file, class, method) allows for a flexible (extensible) system that can be further refined for instrumentation at, for example, the line level in another embodiment of the present invention. The design may be extended with a LineProcessor class where the instrumentation occurs rather than at the MethodProcessor class 1505 level. The Updater class 1503 generates a new JAR file containing the instrumentation commands at the conclusion of the instrumentation process.

Once the instrumented application file is generated, it may be deployed (transferred) to the mobile device or it may first be further processed before being deployed. In the example embodiment above, the instrumented JAR file is deployed to the mobile device where it can begin generating performance measurements. In another embodiment of the present invention, a new JAR file (application file) is not created by the instrumentation tool process and only a Config (configuration or instrumentation) file is created containing the measuring points and methods for instrumentation. According to this embodiment, both the original JAR file and the Config file are deployed to the mobile device. In this embodiment the Java™ class loader may need to be modified in order to perform the bytecode instrumentation at runtime. The Java™ class loader loads both the JAR file and the Config file classes while performing the instrumentation on the fly. According to this embodiment, no code enhancement of the application file is made and instrumentation occurs only at runtime without changing the underlying application file (e.g., JAR file). This is particularly beneficial in a case where an application file is enhanced by either an additional certificate or authentication in order to provide application security. Under these circumstances, performing the instrumentation of the application file entities at runtime may be easier than performing code enhancement (instrumentation) before the certificate or authentication is generated for the application file (which is generally prior to deploying the application file to the mobile device) which would otherwise be necessary.

Otherwise restated, in one embodiment of the present invention a code enhancement of the application file (e.g., the JAR file) may be performed and the enhanced (i.e., instrumented) application file may be loaded into memory during execution of the application and executed on the mobile device (or other resource limited device). In an alternative embodiment, the code enhancement (instrumentation) information is stored in a separate instrumentation file and this instrumentation file and the original unaltered application file are deployed to the mobile device or other resource limited device. Both files are loaded into memory during the execution of the application and the instrumentation of the application occurs at runtime. This alternative embodiment is particularly advantageous where the deployed application file (e.g., the JAR file) is controlled to prevent changes through some certification mechanism. The certification of the file may fail if the application file is modified after certification occurs. Therefore, the certified application file must be deployed unchanged to the mobile device, loaded into memory and the appropriate certification checks performed prior to code enhancement or instrumentation (the details of which are provided in an instrumentation file) of the entities in the application file.

Figure 16:
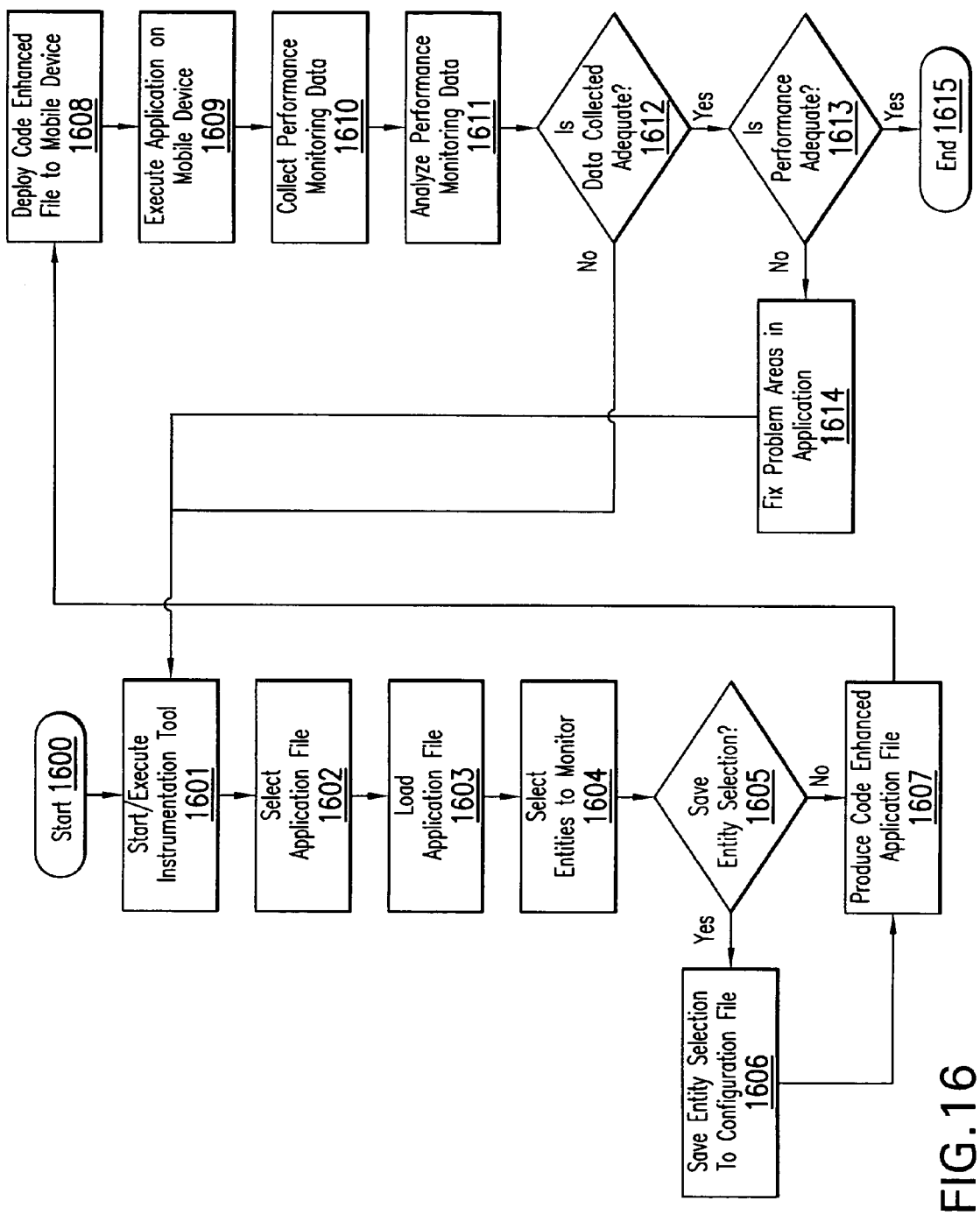
FIG. 16 is a diagram illustrating a process to identify problem areas of an application according to one embodiment of the present invention.

FIG. 16 is a diagram illustrating a process to identify problem areas of an application according to one embodiment of the present invention. According to this embodiment, this process allows for the identification of potential problem areas or "hot spots" in the code entities of the application that have insufficient or undesirable performance characteristics. Due to the more technical nature of this monitoring, a specialist such as a developer or consultant rather than an end-user is more likely to be involved though this embodiment is not limited to any particular class of individual. The process begins 1600 by starting the implementation tool 1601. The user of the implementation tool then selects 1602 an application file (e.g. an archive file—JAR file) which is then loaded 1603 into the instrumentation tool. As discussed in the example embodiment above, the application file entities may be determined and presented in a hierarchical tree structure as part of this loading process. In the next step 1604, the user of the instrumentation tool selects application (code) entities to be monitored. The user may then determine 1605 whether the selected entities are saved 1606 to a selection file (also called a configuration file above). The instrumentation tool may then use the selected entities to perform code enhancement 1607 to the original application file resulting in the creation of an instrumented or enhanced application file. In the next step 1608, the code enhanced (instrumented) application file is then deployed to the mobile device or other resource limited device. During execution of the application 1609 on the mobile device, the application file data is loaded into memory and executed including the performance monitoring methods instrumented into the code enhanced application file. As a result, performance monitoring data is collected 1610 in a file (e.g., a performance monitoring log file) on the mobile device. A user (e.g., a consultant or developer) may then analyze 1611 the performance monitoring data. This may occur using the data on the mobile device or the data may first be transferred to a remote device such as, for example, a workstation or server. A determination 1612 is made by the user whether the monitored data is sufficient. If the data is not sufficient, the user may use the instrumentation tool along with the stored settings in the selection or configuration file to generate a new entity selection in the instrumentation tool and reiterate the process. If the data is sufficient, a determination 1613 may be made whether the performance is adequate. If the performance is not adequate then the problem areas need to be fixed 1614 and the performance monitoring process repeated to determine how these changes perform. If the performance is adequate, then the performance monitoring process can terminate 1615. In an alternative embodiment of the present invention, step 1606 is always performed instead of step 1607 with this selection or configuration file possibly containing additional data. This file is also deployed with the original application file to the mobile device in step 1608 and both are loaded into memory in step 1609. Other than the changes to these sections, the other steps in this process function similarly according to this alternative embodiment.

What is claimed is:

1. A computer-implemented method for performance monitoring of an application file on a resource-limited device, comprising:

presenting a list of entities from the application file to a user;

receiving a selection by the user of an entity for performance monitoring from the presented list of entities;

generating a performance monitoring object for the user selected entity;

identifying whether the application file is controlled through a certification mechanism to prevent changes to the application file;

when the application file is controlled through the certification mechanism:

sending the application file and the performance monitoring object to a processor to be executed;

identifying the user selected entity in the application file from the performance monitoring object during the execution of the application file;

exclusively generating performance monitoring data that is directly stored in a separate file on the resource-limited device by executing the performance monitoring object on the identified user selected entity when the identified user selected entity in the application file is executed by the processor on the resource-limited device under conditions specified in the performance monitoring object; and deploying the application file and the performance monitoring object to the resource-limited device; and otherwise, when the application file is not controlled through the certification mechanism:

integrating the performance monitoring object into the application file to generate performance monitoring data;

exclusively generating performance monitoring data that is directly stored in a separate file on the resource-limited device by executing the performance monitoring object when the application file is executed on the resource-limited device under conditions specified in the integrated performance monitoring object; and deploying the application file to the resource-limited device.

2. The computer-implemented method according to claim 1, wherein the application file is an archive file.

3. The computer-implemented method according to claim 2, further comprising modifying the application file to manipulate a bytecode associated with the archive file.

4. The computer-implemented method according to claim 1, further comprising:

presenting entities from an application file to a user in a hierarchical tree of entities.

5. The computer-implemented method according to claim 1, further comprising:

presenting entities from an application file to a user in a hierarchical tree of entities, wherein at least one of a selection operation and a deselection operation of a node in the hierarchical tree of entities results in a similar operation for all subordinate nodes in the hierarchical tree of entities.

6. The computer-implemented method according to claim 1, further comprising:

receiving a selection by the user of an entity for performance monitoring from the presented list of entities, wherein the presented list of entities are displayed in a hierarchical tree of entities.

7. The computer-implemented method according to claim 1, wherein the performance monitoring object is at least one of a class object and a method recording a performance monitoring data item to a log file.

8. The computer-implemented method according to claim 7, wherein the log file is periodically transferred to a remote device where the log file undergoes at least one of a) a more thorough analysis, b) archiving for a future reference, and c) removal from the resource-limited device to make an additional resource available to the resource-limited device while maintaining the performance monitoring data item in the log file.

9. The computer-implemented method according to claim 1, wherein the resource-limited device is a mobile device.

10. The computer-implemented method according to claim 1, further comprising modifying the application file to incorporate the performance monitoring object and the user selected entity into a same bytecode.

11. The computer-implemented method according to claim 1, further comprising modifying the application file to incorporate the performance monitoring object and the user selected entity into a same source code file.

12. A system for performance monitoring of an application file on a resource-limited device, comprising:

a program memory;

a storage device; and a processor, wherein the processor is adapted to:

present a list of entities from the application file to a user;

receive a selection by the user of an entity for performance monitoring from the presented list of entities;

generate a performance monitoring object for the user selected entity;

identify whether the application file is controlled through a certification mechanism to prevent changes to the application file;

when the application file is controlled through the certification mechanism:

send the application file and the performance monitoring object to a processor to be executed;

identify the user selected entity in the application file from the performance monitoring object during the execution of the application file;

exclusively generate performance monitoring data that is directly stored in a separate file on the resource-limited device by executing the performance monitoring object on the identified user selected entity when the identified user selected entity in the application file is executed by the processor on the resource-limited device under conditions specified in the performance monitoring object; and deploy the application file and the performance monitoring object to the resource-limited device; and otherwise, when the application file is not controlled through the certification mechanism:

integrate the performance monitoring object into the application file to generate performance monitoring data;

exclusively generate performance monitoring data that is directly stored in a separate file on the resource-limited device by executing the performance monitoring object when the application file is executed on the resource-limited device under conditions specified in the integrated performance monitoring object; and deploy the application file to the resource-limited device.

13. The system according to claim 12, further comprising modifying the application file to incorporate the performance monitoring object and the user selected entity into a same bytecode.

14. The system according to claim 12, further comprising modifying the application file to incorporate the performance monitoring object and the user selected entity into a same source code file.

15. A non-transitory computer readable medium storing instructions adapted to execute a method for performance monitoring of an application file on a resource-limited device, the method comprising:

presenting a list of entities from the application file to a user;

receiving a selection by the user of an entity for performance monitoring from the presented list of entities;

generating a performance monitoring object for the user selected entity;

identifying whether the application file is controlled through a certification mechanism to prevent changes to the application file;

when the application file is controlled through the certification mechanism:

sending the application tile and the performance monitoring object to a processor to be executed;

identifying the user selected entity in the application file from the performance monitoring object during the execution of the application file;

exclusively generating performance monitoring data that is directly stored in a separate file on the resource-limited device by executing the performance monitoring object on the identified user selected entity when the identified user selected entity in the application file is executed by the processor on the resource-limited device under conditions specified in the performance monitoring object; and deploying the application file and the performance monitoring object to the resource-limited device; and otherwise, when the application file is not controlled through the certification mechanism:

integrating the performance monitoring object into the application file to generate performance monitoring data;

exclusively generating performance monitoring data that is directly stored in a separate file on the resource-limited device by executing the performance monitoring object when the application file is executed on the resource-limited device under conditions specified in the integrated performance monitoring object; and deploying the application file to the resource-limited device.

16. The non-transitory computer readable medium according to claim 15, further comprising modifying the application file to incorporate the performance monitoring object and the user selected entity into a same bytecode.

17. The non-transitory computer readable medium according to claim 15, further comprising modifying the application file to incorporate the performance monitoring object and the user selected entity into a same source code file.

* * * * *